(12) United States Patent
Sanderovich et al.

(10) Patent No.: US 11,012,106 B2
(45) Date of Patent: May 18, 2021

(54) IMPLEMENTATION OF IMPROVED OMNI MODE SIGNAL RECEPTION

(71) Applicant: QUALCOMM Incorporated, San Diego, CA (US)

(72) Inventors: Amichai Sanderovich, Atlit (IL); Michael Leviant, Binyamina (IL); Simha Sorin, Zoran (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/274,819

(22) Filed: Sep. 23, 2016

(65) Prior Publication Data

US 2018/0091179 A1 Mar. 29, 2018

(51) Int. Cl.
*H04B 1/10* (2006.01)
*H04B 7/08* (2006.01)
*H04B 1/16* (2006.01)

(52) U.S. Cl.
CPC ......... *H04B 1/1027* (2013.01); *H04B 7/0882* (2013.01); *H04B 1/16* (2013.01); *Y02D 30/70* (2020.08)

(58) Field of Classification Search
CPC ..... H04W 24/08; H04W 4/185; H04W 84/18; H04W 88/02; H04B 1/40; H04B 1/406; H04B 1/44; H04B 17/26; H04B 7/0413; H04B 1/1027; H04B 7/0882; H04B 10/61; H04B 1/50; H04B 10/2589; H04B 10/40; H04B 10/63; H04B 1/06; H04B 1/10; H04B 1/16; H04B 1/18; H04B 7/12; H04L 1/0045; H04L 27/2647; H04L 27/265;

(Continued)

(56) References Cited

U.S. PATENT DOCUMENTS 4,234,952 A * 11/1980 Gable .................. H04L 12/413
                                                    370/448
4,484,182 A * 11/1984 Schofield ............... G08B 29/24
                                                    340/501

(Continued)

OTHER PUBLICATIONS

Lu X., et al., "Detection Probability Estimation of Directional Antennas and Omni-Directional Antennas", Wireless Personal Communications, Aug. 11, 2009, vol. 55, Issue 1, pp. 51-63.

(Continued)

*Primary Examiner* — Lana N Le
(74) *Attorney, Agent, or Firm* — Qualcomm Incorporated

(57) ABSTRACT

In an aspect of the disclosure, an apparatus for wireless communication is provided. The apparatus may include several detectors, each of which may be configured to detect a signal received by a corresponding antenna of several antennas. The apparatus may include a processing system configured to detect a remote apparatus based on outputs from the detectors. The apparatus may include several modem radio frequency chips each including a corresponding detector of the several detectors, and a modem baseband chip including the processing system. The processing system may be configured to allow at most one of the detectors to output a detection declaration to the processing system at a time. The processing system may be configured to send a power-down command to and disconnect from each of the detectors that does not detect the signal from a corresponding antenna of the several antennas.

36 Claims, 8 Drawing Sheets

(58) Field of Classification Search
CPC . H04L 2027/0067; H04L 27/06; H04L 27/22; H04L 7/0332; H03M 1/12; H03M 3/41
USPC .................................................. 455/130–355
See application file for complete search history.

(56) References Cited

U.S. PATENT DOCUMENTS

| | | | | |
|---|---|---|---|---|
| 5,727,027 | A * | 3/1998 | Tsuda | H04L 27/2332 375/325 |
| 6,249,686 | B1 * | 6/2001 | Dvorkin | H04B 1/28 455/552.1 |
| 6,839,876 | B1 * | 1/2005 | Tong | H04J 13/107 375/340 |
| 7,224,685 | B2 | 5/2007 | Proctor et al. | |
| 7,308,285 | B2 | 12/2007 | Nelson et al. | |
| 7,546,107 | B2 * | 6/2009 | Noda | H04B 1/126 455/283 |
| 7,711,032 | B2 * | 5/2010 | Diaz Fuente | H04B 1/707 375/146 |
| 9,118,358 | B2 | 8/2015 | Laroia et al. | |
| 9,413,420 | B1 * | 8/2016 | Kong | H04W 72/044 |
| 9,595,922 | B2 * | 3/2017 | Maderbacher | H03F 3/387 |
| 2002/0080745 | A1 * | 6/2002 | Dick | H04B 1/707 370/335 |
| 2003/0040329 | A1 * | 2/2003 | Yona | H04W 88/085 455/507 |
| 2003/0137669 | A1 * | 7/2003 | Rollins | G01N 21/4795 356/479 |
| 2003/0203743 | A1 * | 10/2003 | Sugar | H04B 1/0057 455/550.1 |
| 2004/0142670 | A1 * | 7/2004 | Ciccarelli | H04B 1/109 455/214 |
| 2005/0070341 | A1 * | 3/2005 | Umewaka | H04B 7/0814 455/574 |
| 2006/0034271 | A1 | 2/2006 | DiRenzo et al. | |
| 2006/0170565 | A1 * | 8/2006 | Husak | G06K 7/0008 340/8.1 |
| 2006/0182072 | A1 * | 8/2006 | Ransome | H04W 84/12 370/338 |
| 2006/0276227 | A1 * | 12/2006 | Dravida | H04B 7/0413 455/562.1 |
| 2007/0165747 | A1 * | 7/2007 | May | H04B 15/02 375/316 |
| 2008/0130599 | A1 * | 6/2008 | Horikoshi | H04B 7/0817 370/338 |
| 2008/0212661 | A1 * | 9/2008 | Okada | G07C 7/00 375/219 |
| 2012/0038520 | A1 | 2/2012 | Cornwell | |
| 2012/0052827 | A1 | 3/2012 | Sadek et al. | |
| 2013/0202062 | A1 * | 8/2013 | Sadr | H04L 1/0054 375/324 |
| 2014/0112304 | A1 * | 4/2014 | Shimizu | H04J 13/16 370/330 |
| 2014/0288708 | A1 * | 9/2014 | Casey | G05D 1/0238 700/253 |
| 2015/0263770 | A1 * | 9/2015 | Huang | H04B 1/1027 455/226.3 |
| 2015/0318979 | A1 * | 11/2015 | Ciacci | H04L 7/0012 375/358 |
| 2015/0349863 | A1 * | 12/2015 | El Ayach | H04B 7/0456 375/295 |
| 2015/0351104 | A1 * | 12/2015 | Sagae | H04W 72/082 370/329 |
| 2016/0277177 | A1 * | 9/2016 | de Ruijter | H04L 1/206 |
| 2016/0295502 | A1 * | 10/2016 | Yoon | H04W 52/0229 |
| 2018/0123857 | A1 * | 5/2018 | Limberg | H04L 1/0045 |

OTHER PUBLICATIONS

International Search Report and Written Opinion—PCT/US2017/051811—ISA/EPO—dated Mar. 16, 2018.

\* cited by examiner

IMPLEMENTATION OF IMPROVED OMNI MODE SIGNAL RECEPTION

BACKGROUND

Field

The present disclosure relates generally to communication systems, and more particularly, to an omni mode for improved signal reception coverage.

Background

Communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

SUMMARY

The following presents a simplified summary of one or more aspects in order to provide a basic understanding of such aspects. The summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

As communication networks become increasingly populated by wireless nodes, more efficient methods for transmitting information and reducing interference is needed. The disclosure below describes methods for more efficiently transmitting information and reducing interference.

In an aspect of the disclosure, an apparatus for wireless communication is provided. The apparatus may include several detectors, each of which may be configured to detect a signal received by a corresponding antenna of several antennas. The apparatus may include a processing system configured to detect a remote apparatus based on outputs from the detectors. The apparatus may include several modem radio frequency chips each including a corresponding detector of the several detectors, and a modem baseband chip including the processing system. The processing system may be configured to allow at most one of the detectors to output a detection declaration to the processing system at a time. The processing system may be configured to send a power-down command to each of the detectors that does not detect the signal from a corresponding antenna of the several antennas. The processing system may be configured to disconnect from each of the detectors that does not detect the signal from a corresponding antenna of the several antennas. The processing system may be configured to stop any communication (e.g., transmission, reception, signaling, etc.) by the apparatus that may interfere with the reception of the detected signal. The processing system may be configured to disconnect from each of the detectors that does not detect the signal from a corresponding antenna of the several antennas.

Each of the detectors may be further configured to estimate at least one of frequency, gain, signal-to-noise ratio (SNR), in-phase (I) and quadrature (Q) signal mismatch, or phase to enhance performance of the apparatus. The estimation result may be sent to the processing system. In one configuration, the estimation of gain may be used for faster automatic gain control (AGC). For example, the estimation of gain may enable convergence of radio frequency (RF) gain, analog baseband gain, and intermediate frequency (IF) gains in short time, during the preambles that are used for detection. In one configuration, providing the frequency estimation to the processing system may save time in the processing system in the subsequent acquisition stage. In one configuration, the estimation may be used for selecting sector during sector sweep, e.g., according to the maximum gain or SNR. In one configuration, the device may be calibrated using these estimations (e.g., SNR).

In another aspect of the disclosure, a method and an apparatus for wireless communication are provided. The apparatus may detect signals via several detectors, each of which may detect a signal received by a corresponding antenna of several antennas. The apparatus may detect a remote apparatus based on outputs from the detectors. To detect the remote apparatus, the apparatus may combine the outputs from the detectors. To combine the outputs, the apparatus may allow at most one of the detectors to output a detection declaration to a processing system of the apparatus at a time. To detect the remote apparatus, the apparatus may send a power-down command to each of the detectors that does not detect the signal from a corresponding antenna. To detect the remote apparatus, the apparatus may disconnect from each of the detectors that does not detect the signal from a corresponding antenna. To detect the remote apparatus, the apparatus may stop any communication (e.g., transmission, reception, signaling, etc.) by the apparatus that may interfere with the reception of the detected signal. To detect the signals, the apparatus may estimate at least one of frequency, gain, SNR, IQ signal mismatch, or phase to enhance performance of the apparatus.

To the accomplishment of the foregoing and related ends, the one or more aspects include the features hereinafter fully described and particularly pointed out in the claims. The following description and the annexed drawings set forth in detail contain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. However, the appended drawings illustrate only certain typical aspects of the disclosure and are therefore not to be considered limiting of the disclosure's scope, for the description may admit to other equally effective aspects.

DETAILED DESCRIPTION

Figure 1:
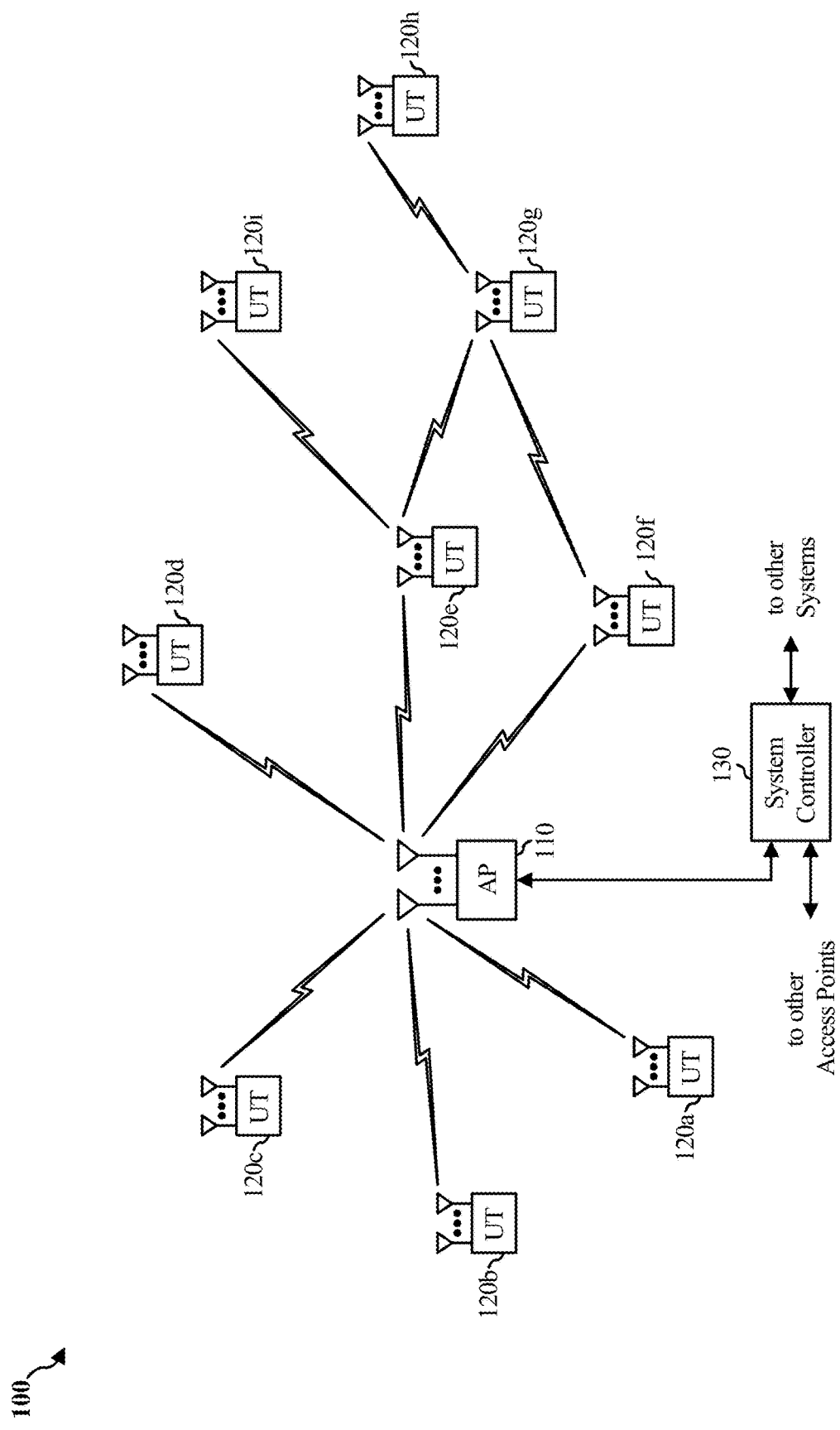
FIG. 1 illustrates a diagram of an example wireless communications network, in accordance with certain aspects of the present disclosure.

Various aspects of the disclosure are described more fully hereinafter with reference to the accompanying drawings. The disclosure may, however, be embodied in many different forms and should not be construed as limited to any specific structure or function presented throughout the disclosure. Rather, the aspects are provided so that the disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, one access point 110 is shown in FIG. 1. An access point may be a fixed station that communicates with the user terminals and may also be referred to as a base station or some other terminology. A user terminal may be fixed or mobile and may also be referred to as a mobile station, a wireless node, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals (e.g., "legacy" stations) to remain deployed in an enterprise, extending such terminals' useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA techniques, different code channels with CDMA, disjoint sets of subbands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals may have the same number of antennas or a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., to reduce cost) or equipped with multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
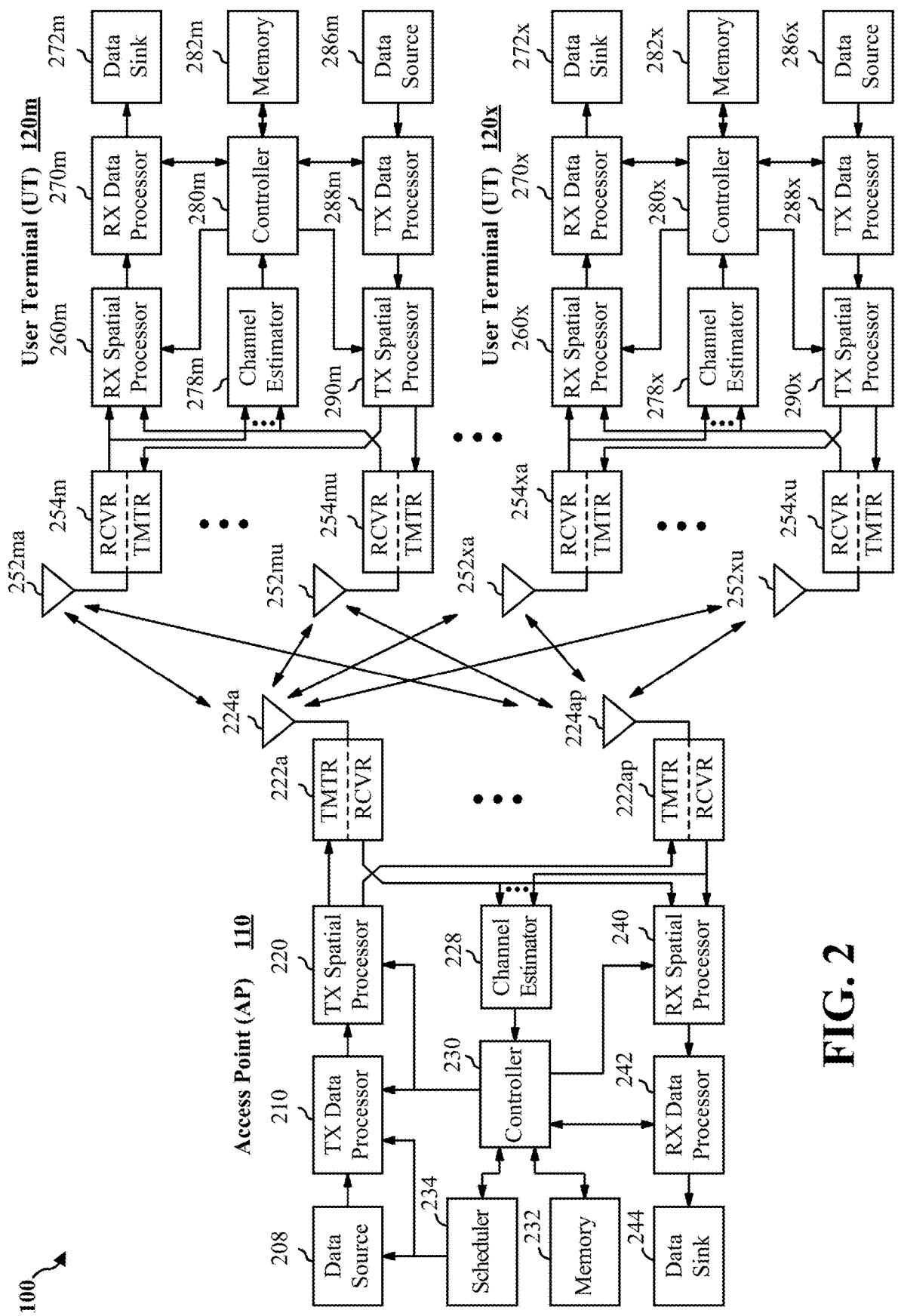
FIG. 2 illustrates a block diagram of an example access point (AP) and user terminals (UTs), in accordance with certain aspects of the present disclosure.

FIG. 2 illustrates a block diagram of an access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein.

The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while $N_{dn}$ user terminals are simultaneously transmitted to on the downlink by the access point 110. $N_{up}$ may or may not be equal to N dn, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for Nan user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Nan downlink data symbol streams for the Nan user terminals. A TX spatial processor 220 performs spatial processing (such as a precoding or beamforming, as described in the present disclosure) on the Nan downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In certain systems such as IEEE 802.11ad and mmWave type systems, one device may use a high sensitivity transmission/reception mode, which may be referred to as a "control PHY" mode, in order to reach or connect to another device whose receive antennas are not yet trained. In the high sensitivity transmission mode, a transmitting device may transmit physical layer (PHY) frames at a lower data rate supported by each of the devices operating in the system, in order to communicate basic control information, e.g., beamforming training information.

A receiver operating in the high sensitivity transmission/reception mode may operate in an "omni" mode, where the receiver's antennas are configured such that they can receive signals from all directions. That is, prior to beamforming training, a device may not know the direction from which a signal may be received and, thus, may be configured to receive signals from all directions. Some such receivers may use a single receive chain or may use a plurality of receive chains. In general, a receive chain refers to a set of components used to process and detect an RF signal received via one or more antennas.

When using a single receive chain with a single detector in an omni mode of operation, coverage of the device may be determined by the sensitivity of the receive chain and the particular antenna configuration, as opposed to a link-budget of a trained link. Therefore, even though the control PHY mode of transmission may use a low transmission rate, e.g., 23 megabits per second (mbps), poor signal-to-noise ratio (SNR) for signals received from certain directions may result in poor coverage.

Some devices may include a plurality of omni elements in an antenna array arranged to receive signals omni-directionally. A single receive chain with a single detector circuit may not have sufficient sensitivity for the configuration. For example, a sensitivity for a single receive chain with a single detector circuit may be 15 dB below the sensitivity that may be needed for a device to operate in the control PHY mode.

Figure 3:
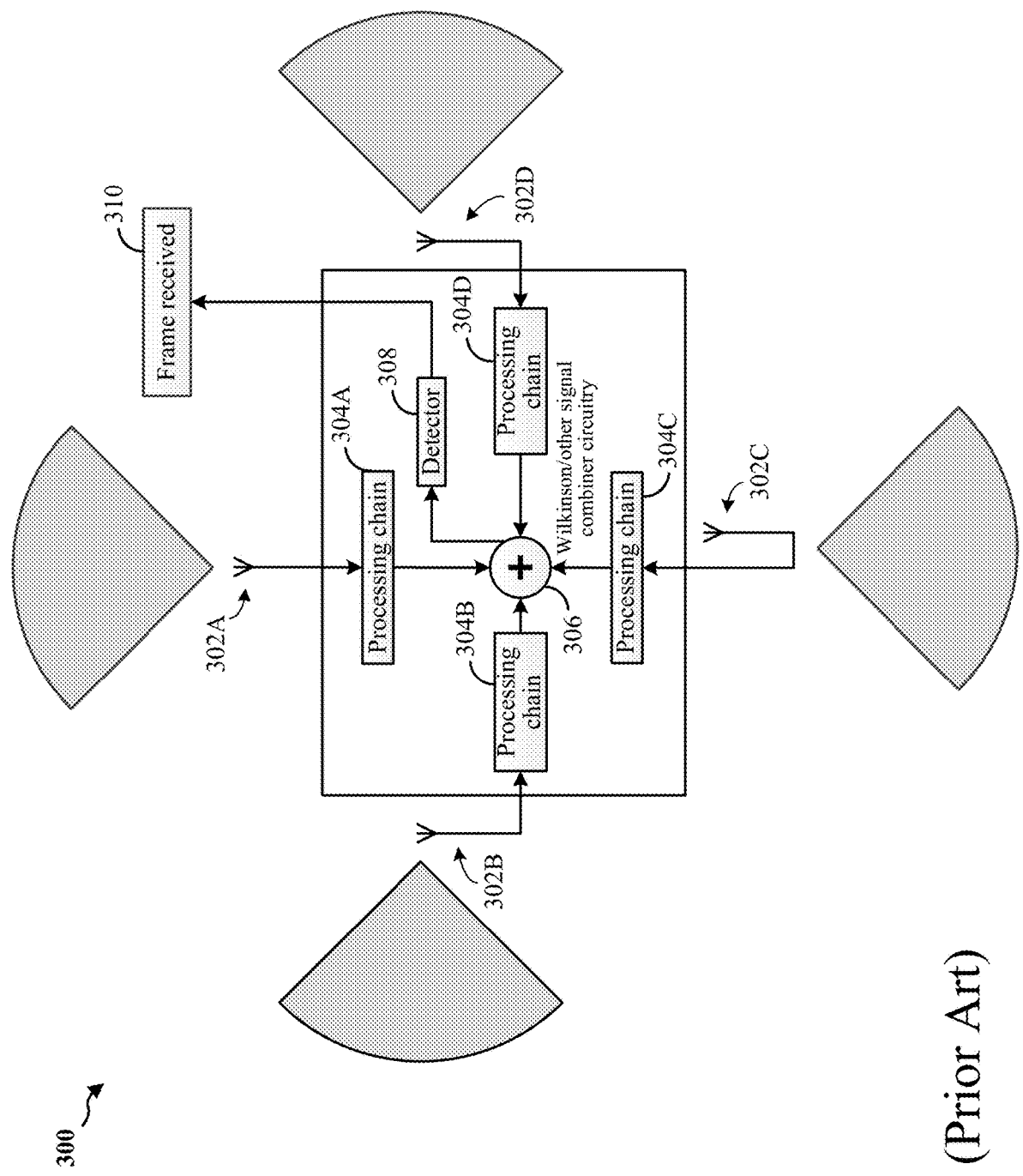
FIG. 3 illustrates an example of a device with a single detector.

FIG. 3 illustrates an example of a device 300 with a single detector. In this example, the device 300 has four antennas 302A, 302B, 302C, 302D (collectively, 302), each configured to receive signals from one direction of a plurality of directions. The signals received by each of the antennas 302 are processed by respective processing chains 304A, 304B, 304C, and 304D (collectively, processing chains 304). The outputs of each of the processing chains 304 may be combined via a combiner circuit 306 (e.g., a Wilkinson combiner) to generate a single input to a single detector 308 which, for example, may include a mixer and an analog-to-digital converter (ADC). The detector is configured to detect a signal, which may be received by one of the plurality of antennas 302 and, e.g., from one of a plurality of directions. Based on an output of the detector, a processing system may determine whether a frame 310 is received by at least one of the antennas 302. In one configuration, the processing system may compare the output of the detector with a threshold to determine whether a frame 310 is received by at least one of the antennas 302.

In the configuration illustrated in FIG. 3, noise from each of the plurality of antennas is added to the combined signal that is input to the detector 308. Therefore, by having a single detector 308 that receives a combined output of the plurality of processing chains, a noise floor of the input to the detector is increased (e.g., by 6 dB), thus resulting in a reduction in coverage (e.g., by 6 dB) as compared to device 400 of FIG. 4, described in more detail below.

For example, a device may include three antenna arrays, a first antenna array oriented according to a vertical polarization, a second oriented according to a horizontal polarization, and a third oriented according to the side of the receiving device. As noted above, however, the device may have a receive chain with a single detector used for all of such arrays, which may make it difficult to actually detect direction of a received signal. By including multiple detectors in a receiving device, however, signal reception coverage of a device may be increased by, e.g., by taking advantage of the antenna gain that may be provided by multiple antenna arrays. As an example, assuming the same three-array configuration discussed above, three different detectors may be used to detect signals received by each of the antenna arrays. This arrangement may decrease receiver sensitivity required for signal detection (e.g., by 5 dB), and increase reception coverage of the device. In one configuration, the reception overage of a device may be the range of signals that may be received by the device.

Aspects of the present disclosure provide techniques and apparatuses that use multiple receive chains/detectors within the same receiving device. In an aspect, the signal reception sensitivity of the receiving device may be lowered by effectively combining antenna gain for each of the receive chains. In other words, rather than utilizing a single receive chain/detector, the device may benefit from receive diversity by utilizing a plurality of receive chains/detectors. In this manner, aspects of the present disclosure provide techniques and apparatus for improving the coverage of omni mode signal reception by including a designated detector for each process chain of a plurality of processing chains.

Figure 4:
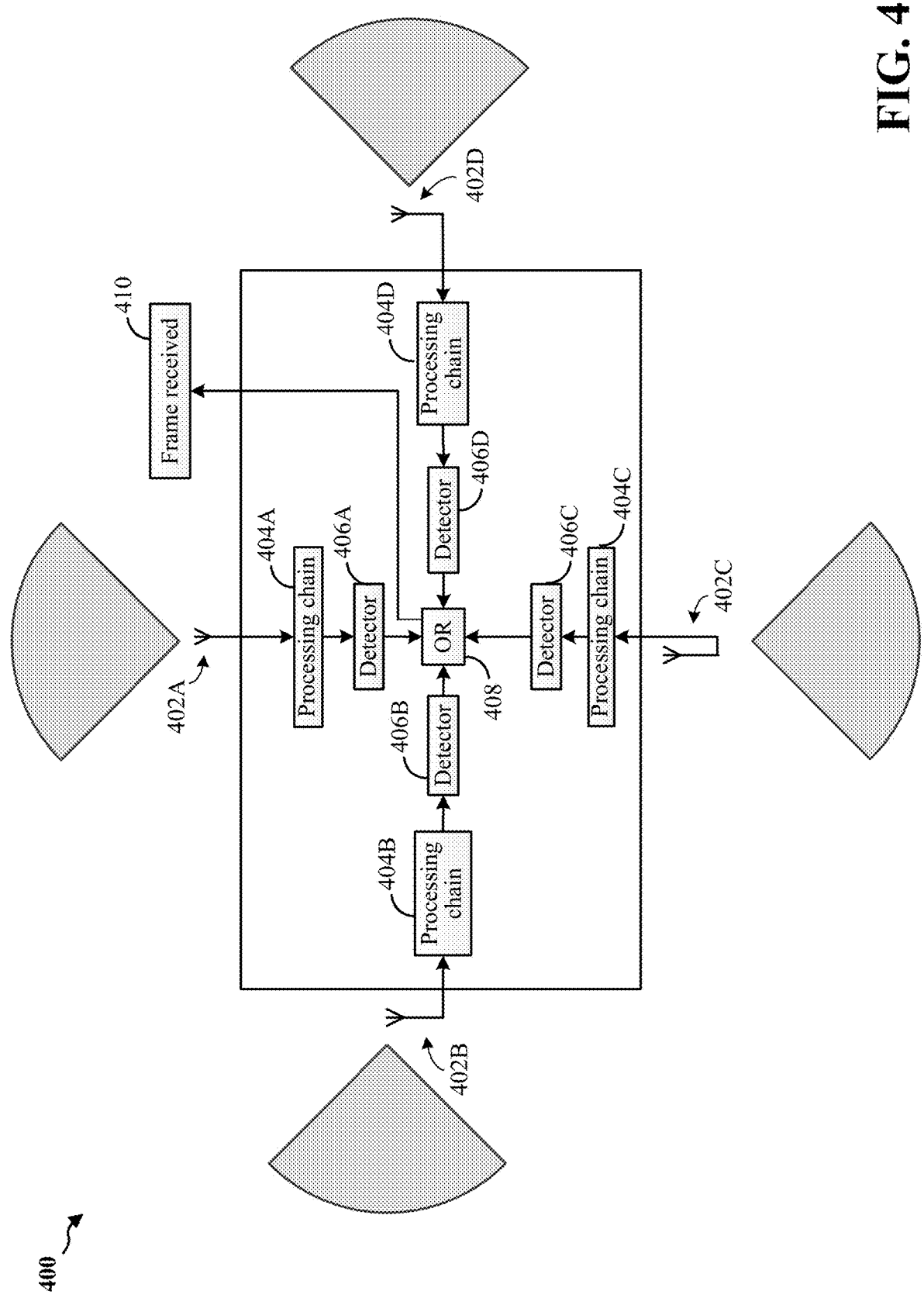
FIG. 4 is a block diagram of a device having a plurality of detectors, each configured to detect a signal (e.g., a control PHY preamble) received by a respective one of a plurality of antenna arrays, in accordance with certain aspects of the present disclosure.

FIG. 4 is a block diagram of a device 400 having a plurality of detectors 406A, 406B, 406C, 406D (collectively, detectors 406), each configured to detect a signal (e.g., a control PHY preamble) received by a respective one of a plurality of antenna arrays 402A, 402B, 402C, 402D (collectively, 402), in accordance with certain aspects of the present disclosure. That is, a signal received by at least one of the plurality of antenna arrays 402 may be processed via a respective processing chain (e.g., one of the plurality of processing chains 404A, 404B, 404C, and 404D (collectively, processing chains 404)), and detected by a respective one of the plurality of detectors 406. The outputs of the detectors 406 may be combined (e.g., a logic OR operation via logic gate 408) and a processing system of the device may use the combined signal to determine whether a frame 410 has been received. For example, the processing system may monitor and determine when the output of the logic gate 408 indicates a logic high. Based on this determination, the processing system can determine that one of the plurality of detectors 406 have detected the frame 410, and thus, that the frame 410 has been received.

In certain aspects, each of the detectors 406 may be coupled to a different antenna array of the plurality of antenna arrays 402. In other aspects, each of the detectors 406 may be coupled to a different antenna within one of the plurality of antenna arrays 402. In certain aspects, each of the detectors 406 may be coupled to a plurality of antennas of a respective antenna array through a combiner, where each detector is fed with a different combination of the plurality of antennas, including different gain and/or phase per antenna.

By using at least one detector for each of the antenna arrays 402, noise at the input of each detector may be lower as compared to the device 300 of FIG. 3. Moreover, the signal received by each detector may not impact signals received by the other detectors, since the antenna arrays may not have any significant overlap in reception direction. In some cases, an improvement in coverage (e.g., a 6 dB improvement) may be obtained using the configuration shown in FIG. 4 as compared to the device 300 of FIG. 3.

According to certain aspects of the present disclosure, a processing system of device 400 may be configured to determine a direction (e.g., sector) from which a signal, including frame 410 for example, was transmitted by another device based on the outputs of the plurality of detectors 406. For example, if a signal is more strongly detected by detector 406A, the processing system may determine that the detected signal was received from a direction (e.g., sector) corresponding to the detector 406A. In certain aspects, the processing system of device 400 may be configured to determine a polarization of a signal, including frame 410 for example, based on outputs of the plurality of detectors 406. For example, each detector, of the plurality of detectors 406, may be configured to detect a different polarization of the received signal. Therefore, if a signal is detected by a detector (e.g., detector 406A) that is configured to detect a vertical polarization, then the processing system may determine that the received signal has been received with a vertical polarization. In certain aspects, the polarization may be used to configure the antennas for further communication with an apparatus that transmitted the signal, e.g., including frame 410. For example, the processing system may adjust one or more transmission parameters for communication with the other apparatus based on the determined polarization. In certain aspects, each detector may determine whether a signal is received by comparing an energy level of the received signal with a threshold. In one configuration, the energy level of the received signal may be measured by reference signals received power (RSRP) or signal-to-interference-plus-noise ratio (SINR).

In certain aspects, a device may be configured to communicate with the other device that transmitted the signal, e.g., including frame 410, based on the determined direction. For example, the device may update beamforming parameters to improve communications in the determined direction. For example, the device may control the directionality of signal transmission and reception by configuring transmitting and/or receiving antennas by adjusting beamforming weights of at least one of the plurality of antenna arrays 402 based on the determined direction.

In certain aspects, each of the detectors 406 may be part of one of a plurality of RF modules. In such cases, device 400 may include the plurality of RF modules, each being configured to down convert a signal received by a corresponding one of the antenna arrays to a baseband signal.

In certain aspects, each of the detectors 406 may be configured to detect a particular type of signal transmitted by another device. For example, each detector may be configured to detect a Golay sequence known by the device 400. In some cases, each detector may be configured to detect cyclic repetition signals.

As described herein, by utilizing multiple detectors, aspects of the present disclosure may allow gain of multiple antenna arrays to be combined when detecting a received signal, which may help increase sensitivity, may improve the accuracy of determining a particular direction, and may improve overall performance of the omni direction receiver.

In certain aspects, each of the detectors 406 may be located on a separate radio frequency (RF) chip and the rest of the device 400 (e.g., the logic gate 408 and/or the processing chains 404) may be located on a baseband chip. The base band chip may include memory and one or more processors. For example, the device 400 may include one baseband chip and four RF chips. Each of the four RF chips may contain a corresponding detector of the detectors 406.

Figure 5:
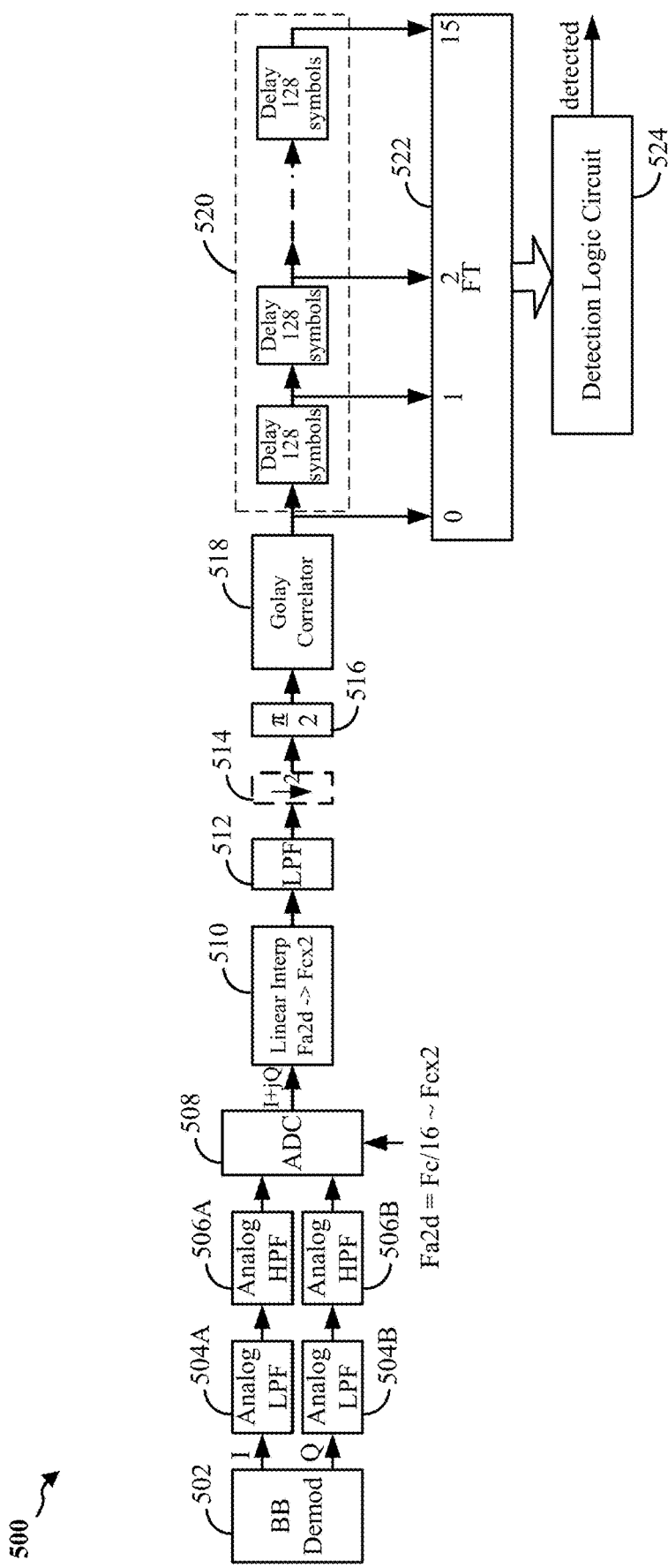
FIG. 5 is a block diagram illustrating an example of an RF chip containing a detector.

FIG. 5 is a block diagram illustrating an example of an RF chip containing a detector 500. In one configuration, the detector 500 may be one of the detectors 406 described above with reference to FIG. 4. In the example, the detector 500 may include a baseband demodulator 502, analog low-pass filters (LPFs) 504A and 504B, analog high-pass filters (HPFs) 506A and 506B, an analog-to-digital converter (ADC) 508, a linear interpolator 510, a low-pass filter 512, an optional decimator 514, a phase-shift modulator 516, a Golay correlator 518, a delay line 520, a Fourier transform (FT) unit 522, and a detection logic circuit 524.

The baseband demodulator 502 may generate an in-phase (I) signal and a quadrature (Q) signal based on a received signal (e.g., a preamble). The I signal may go through the analog low-pass filter 504A and the analog high-pass filter 506A to reach the ADC 508. The Q signal may go through the analog low-pass filter 504B and the analog high-pass filter 506B to reach the ADC 508.

In one configuration, the ADC 508 may be a 1-bit or 2-bit ADC. In one configuration, the detector 500 may include a clock for clocking the ADC. The clock may be asynchronous to the signal received by the corresponding antenna of the detector 500. The ADC 508 may use the carrier frequency ($F_c$) used by RF mixer to approximate the frequency of the received signal. In one configuration, the carrier frequency may be the frequency of a carrier wave. For example, the ADC clock may be the carrier frequency divided by an integer (e.g., 16) to approximate the frequency of the received signal. In some aspects, the detection may work with twice the sampling rate in order to overcome time misalignments between the transmitter and the receiver.

The ADC 508 may output a digital signal to the linear interpolator 510. The output of the linear interpolator 510 may go through the low-pass filter 512 and reach the phase-shift modulator 516. The output of the low-pass filter 512 may go through the optional decimator 514 before reaching the phase-shift modulator 516.

The output of the phase-shift modulator 516 may be sent to the Golay correlator 518. The output of the Golay correlator 518 may reach the FT unit 522 via the delay line 520. The detection logic circuit 524 may receive the output of the FT unit 522 and compare the output with a threshold to determine whether a signal (e.g., preamble) has been detected.

Figure 6:
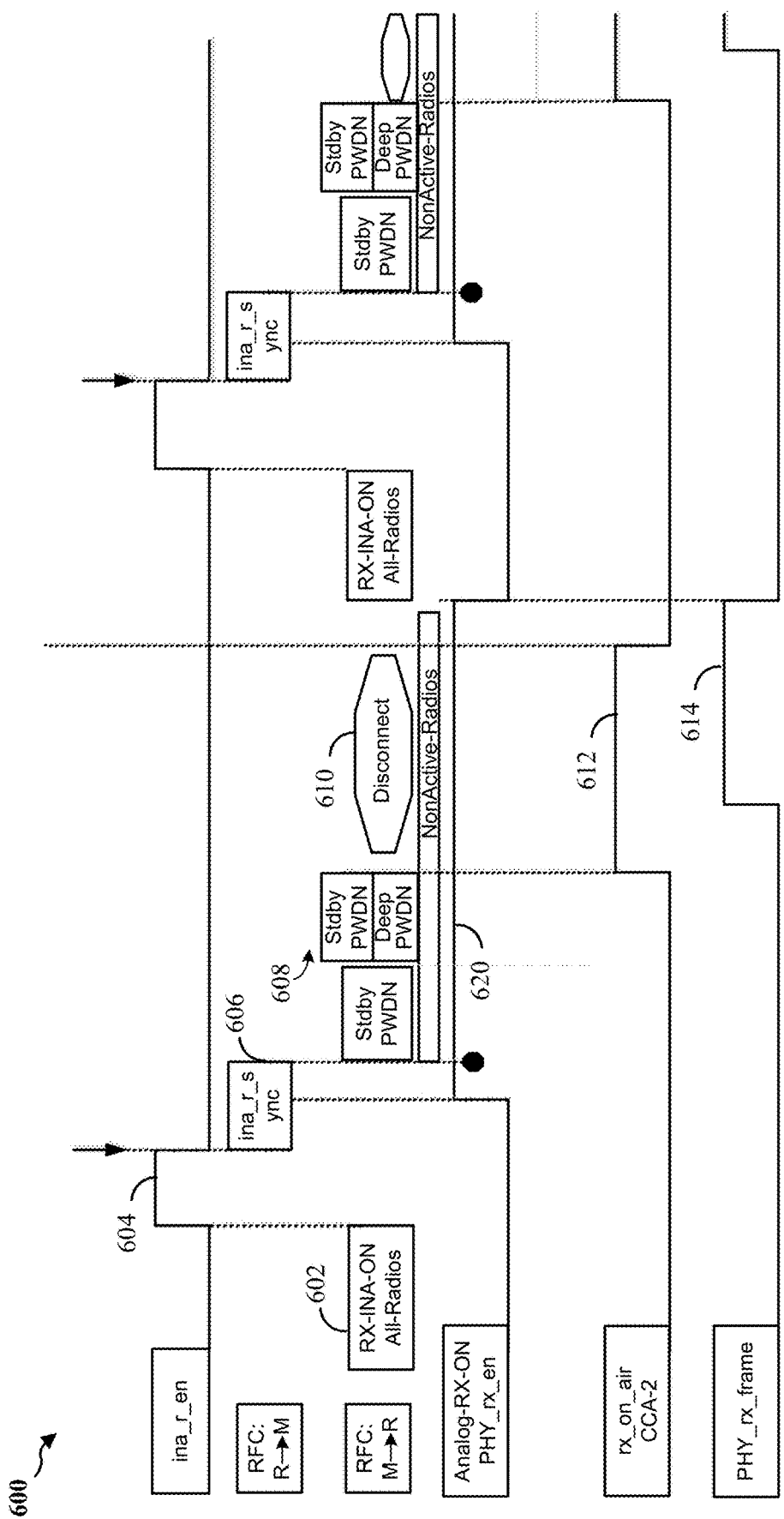
FIG. 6 is a diagram illustrating an example of a detection flow of a device.

FIG. 6 is a diagram illustrating an example of a detection flow of a device. In one configuration, the device may be the device 400 described above with reference to FIG. 4. In this example, the device may include a plurality of RF chips and a baseband chip. Each RF chip may include a detector. A processing system may control the behavior of the detectors by using specific short interface commands, e.g., as described below.

At 602, the base band chip may send a command (e.g., RX-INA-ON) to all RF chips to activate the detectors within all RF chips for detecting signals. At 604, a detector within one of the RF chips may detect a signal (e.g., a preamble). At 606, the RF chip that detects the signal may send a detection declaration signal (e.g., the ina_r_sync signal) to the baseband chip to indicate the detection of the signal. the RF chip that detects the signal may remain analog receive mode during 620. At 608, the baseband chip may send power-down commands (e.g., standby power-down command, deep power-down command) to RF chips that do not receive the signal to power down the RF chips that do not receive the signal. At 610, the baseband chip may disconnect from the RF chips that do not receive the signal. At 612, the device may receive the signal. In one configuration, the baseband chip may stop any communication (e.g., transmission, reception, signaling, etc.) by the device that may interfere with reception of the detection already in progress. At 614, the device may receive the frame associated with the signal. After the frame is received at 614, the operations performed at 602-614 may be repeated.

In certain aspects, the combine logic of the device may be able to take a plurality of detections, each detection of the plurality of detections from a corresponding detector of a plurality of detectors within a plurality of RF chips and select the one detector that detects the signal. In certain aspects, no more than a single RF chip may be fired and allowed to send signal to the base band chip. In certain aspects, the signaling over the RF baseband cable may need to be low latency to allow for the detection to be signaled to the baseband chip to allow for the decoding of the signal. By powering down the RF chips that do not receive the signal and disconnecting the baseband chip from the RF chips that do not receive the signal, the device may be able to ensure contention resolution when multiple detections are happening simultaneously or within a short time frame (e.g., less than 1 picosecond).

Figure 7:
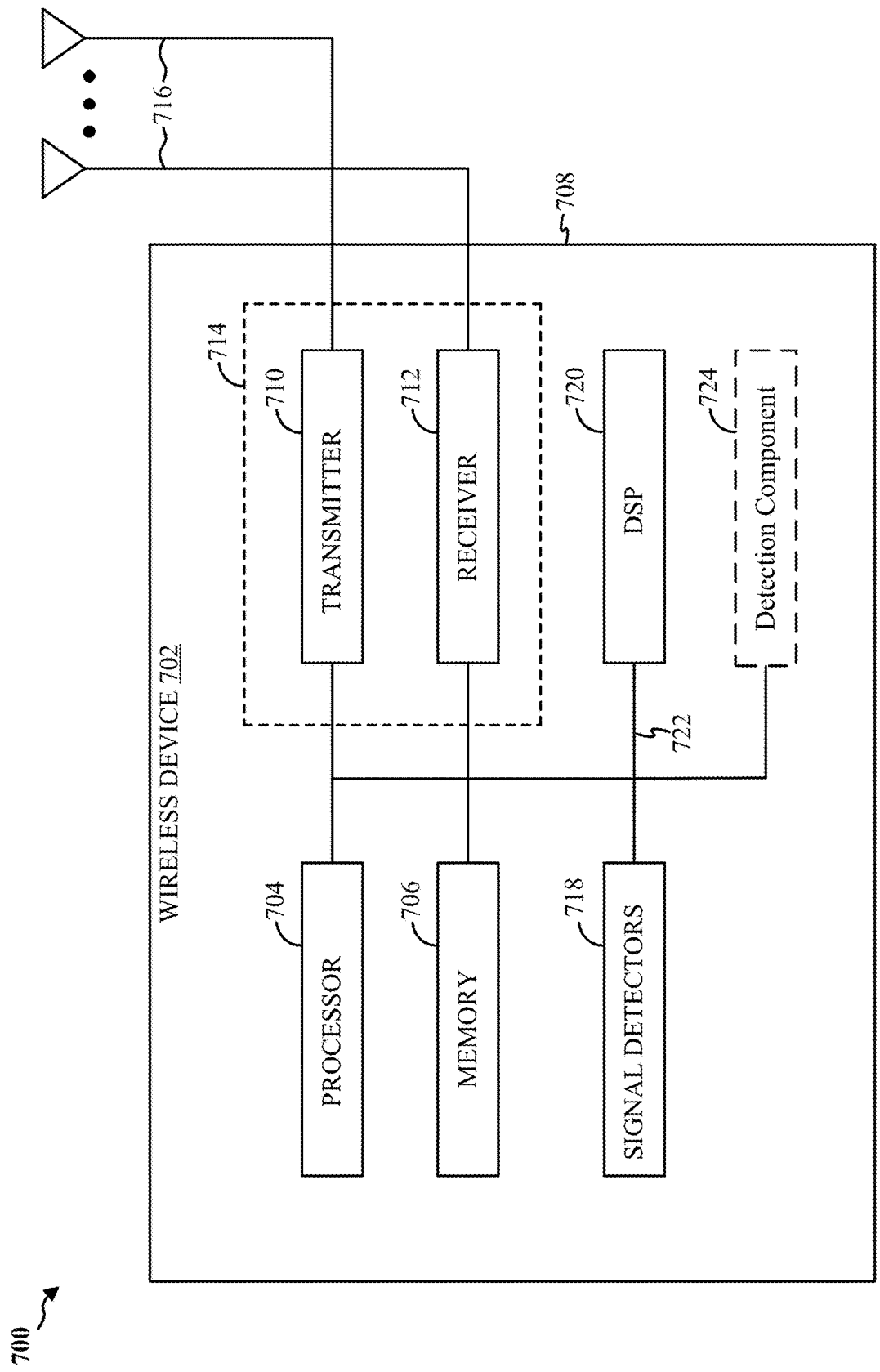
FIG. 7 shows an example functional block diagram of a wireless device configured to detect signal using multiple detectors.

FIG. 7 shows an example functional block diagram of a wireless device 702 configured to detect signal using multiple detectors. In one configuration, each detector may be looking for a signal from a corresponding direction. The wireless device 702 is an example of a device that may be configured to perform the various methods described herein. For example, the wireless device 702 may be the AP 110 and/or the user terminal 120.

The wireless device 702 may include a processor 704 which controls operation of the wireless device 702. The processor 704 may also be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The wireless device 702 may also include a housing 708, and the wireless device 702 may include a transmitter 710 and a receiver 712 to allow transmission and reception of data between the wireless device 702 and a remote device. The transmitter 710 and receiver 712 may be combined into a transceiver 714. A single transmit antenna or a plurality of transmit antennas 716 may be attached to the housing 708 and electrically coupled to the transceiver 714. The wireless device 702 may also include multiple transmitters, multiple receivers, and/or multiple transceivers.

The wireless device 702 may also include a plurality of signal detectors 718 that may be used in an effort to detect and quantify the level of signals received by the transceiver 714 or the receiver 712. The plurality of signal detectors 718 may detect such signals as total energy, energy per subcarrier per symbol, power spectral density and other signals. The signal detectors 718 may be configured to estimate at least one of frequency, gain, SNR, IQ signal mismatch, or phase to enhance performance of the wireless device 702. The estimation result may be sent to the detection component 724.

The wireless device 702 may also include a digital signal processor (DSP) 720 for use in processing signals. The DSP 720 may be configured to generate a packet for transmission. In some aspects, the packet may comprise a PPDU.

The various components of the wireless device 702 may be communicatively coupled by a bus system 722, which may include a power bus, a control signal bus, and a status signal bus in addition to a data bus. In one configuration, when the wireless device 702 is implemented as an AP or a STA configured to transmit data on a data channel, the wireless device 702 may include a detection component 724. The detection component 724 may be configured to detect a remote apparatus based on outputs from multiple detectors. The detection component 724 may be configured to combine the outputs from multiple detectors. The detection component 724 may be configured to allow at most one of the detectors to output a detection declaration to the processing system at a time. The detection component 724 may be configured to send a power-down command to each of the detectors that does not detect the signal from a corresponding antenna. The detection component 724 may be configured to disconnect from each of the detectors that does not detect the signal from a corresponding antenna. The detection component 724 may be configured to stop any communication (e.g., transmission, reception, signaling, etc.) by the wireless device 702 that may interfere with the reception of the detected signal.

In general, an AP and STA may perform similar (e.g., symmetric or complementary) operations. Therefore, for many of the techniques described herein, an AP or STA may perform similar operations. As such, the following description may refer to an "AP/STA" to reflect that an operation may be performed by either an AP or a STA. Although, it should be understood that even if only "AP" or "STA" is used, it does not mean a corresponding operation or mechanism is limited to that type of device.

Figure 8:
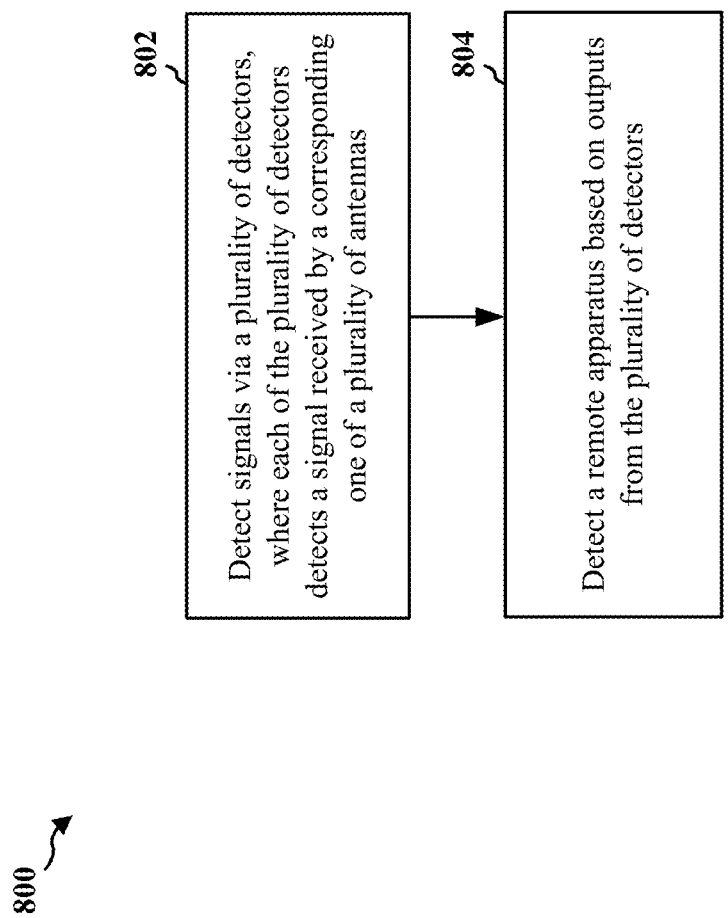
FIG. 8 is a flowchart of an example method of detecting signal using multiple detectors.

FIG. 8 is a flowchart of an example method 800 of detecting signal using multiple detectors. The method 800 may be performed using an apparatus (e.g., the AP 110, the user terminal 120, the device 400, or the wireless device 702, for example). Although the method 800 is described below with respect to the elements of wireless device 702 of FIG. 7, other components may be used to implement one or more of the steps described herein. Blocks denoted by dotted lines may represent optional operations.

At block 802, an apparatus may detect signals via a plurality of detectors. Each detector of the of the plurality of detectors may detect a signal (e.g., by detecting the presence of a frame, but not the content of the frame) received by a corresponding antenna of a plurality of antennas. In one configuration, the plurality of detectors may be the detectors 406 described above with regard to FIG. 4. In one configuration, the plurality of antennas may be the antenna arrays 402 described above with regard to FIG. 4.

At block 804, the apparatus may detect a remote apparatus based on outputs from the plurality of detectors. In one configuration, to detect the remote apparatus, the apparatus may combine the output from each detector of the plurality of detectors. In one configuration, to combine the output of each detector of the plurality of detectors, the apparatus may allow at most one of the plurality of detectors to output a detection declaration to a processing system (e.g., located at a baseband chip of the apparatus) at a time. In one configuration, to detect the remote apparatus, the processing system may send a power-down command to each detector of the plurality of detectors that does not detect the signal from a corresponding antenna of the plurality of antennas. In one configuration, to detect the remote apparatus, the processing system may disconnect from each of the plurality of detectors that does not detect the signal from a corresponding one of the plurality of antennas. In one configuration, to detect the remote apparatus, the processing system may stop any communication (e.g., transmission, reception, signaling, etc.) by the apparatus that may interfere with the reception of the detected signal. In one configuration, to detect the remote apparatus, the processing system may estimate at least one of frequency, gain, SNR, IQ signal mismatch, or phase to enhance performance of the apparatus. In one configuration, the estimation result may be transferred to the processing system. In one configuration, the processing system may be configured to detect the contents of the frame detected by the plurality of detectors.

The apparatus may include a first means for detecting signals via a plurality of detectors. In one configuration, the first means for detecting signals via a plurality of detectors may perform operations described above with reference to 802 of FIG. 8. In one configuration, the first means for detecting signals via a plurality of detectors may be the detectors 406, the detector 500, the antenna arrays 402, the transceiver 714, the plurality of transmit antennas 716, or the plurality of signal detectors 718. In one configuration, the first means for detecting signals may be configured to estimate at least one of frequency, gain, SNR, IQ signal mismatch, or phase to enhance performance of the apparatus.

The apparatus may include a second means for detecting a remote apparatus based on outputs from the plurality of detectors. In one configuration, the second means for detecting a remote apparatus based on outputs from the plurality of detectors may perform operations described above with reference to 804 of FIG. 8. In one configuration, the second means for detecting a remote apparatus based on outputs from the plurality of detectors may comprise a processing system, which may include one or more processors, such as the RX data processor 242, the TX data processor 210, and/or the controller 230 of the access point 110 illustrated in FIG. 2. In one configuration, the processing system may comprise the logic gate 408, the detection component 724, or the processor 704.

In one configuration, the second means for detecting the remote apparatus may be configured to combine the outputs from the plurality of detectors. In one configuration, the second means for detecting the remote apparatus may be further configured to allow at most one detector to output a detection declaration to a processing system at a time. In one configuration, the second means for detecting the remote apparatus may be configured to send a power-down command to each of the plurality of detectors that does not detect the signal from a corresponding one of the plurality of antennas. In one configuration, the second means for detecting the remote apparatus may be configured to disconnect from each of the plurality of detectors that does not detect the signal from a corresponding one of the plurality of antennas. In one configuration, the second means for detecting the remote apparatus may be configured to stop any communication (e.g., transmission, reception, signaling, etc.) by the apparatus that may interfere with the reception of the detected signal.

The various operations of methods described above may be performed by any suitable means capable of performing the operations. The means may include various hardware and/or software component(s) and/or module(s), including, but not limited to a circuit, an application specific integrated circuit (ASIC), or processor. Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-a, b-b, c-c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more blocks or actions for achieving the described method. The method blocks and/or actions may be interchanged with one another without departing from the scope of the claims. In other words, unless a specific order of blocks or actions is specified, the order and/or use of specific blocks and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
   a plurality of detectors, each having a respective Golay correlator, and each being located on a respective one of a plurality of radio frequency (RF) chips, configured to detect a signal received by a corresponding one of a plurality of antennas when each of the plurality of antennas is configured for an omni-mode of signal reception,
      wherein each of the plurality of detectors comprises a 1-bit or 2-bit analog-to-digital converter (ADC) for processing the signal received from the corresponding one of the plurality of antennas, and
      wherein the each of the plurality of detectors comprises a ADC clock for clocking the ADC, the ADC clock having a frequency that is a carrier frequency divided by an integer; and
   a processing system, separate from the plurality of RF chips, configured to:
      detect a remote apparatus based on one or more outputs from the plurality of detectors, and
      configure at least one of the plurality of antennas for beamforming based on the detection of the remote apparatus during the omni-mode of signal reception.

2. The apparatus of claim 1, wherein the processing system controls behavior of one or more of the plurality of detectors by using a set of commands.

3. The apparatus of claim 1, wherein the processing system comprises a logic OR gate coupled to outputs of the plurality of detectors.

4. The apparatus of claim 1, wherein the processing system is further configured to allow at most one of the plurality of detectors to output a detection declaration to the processing system at a time.

5. The apparatus of claim 1, wherein the processing system is further configured to disconnect from each of the plurality of detectors that does not detect the signal from a corresponding one of the plurality of antennas.

6. The apparatus of claim 1, wherein each of the plurality of detectors is further configured to estimate at least one of frequency, gain, signal-to-noise ratio (SNR), in-phase (I) and quadrature (Q) signal mismatch, or phase and further wherein the processing system is configured to calibrate the apparatus based on the estimation.

7. The apparatus of claim 1, wherein the processing system is further configured to:
   determine a direction of the remote apparatus based on the detection of the remote apparatus, and
   wherein the configuration of the at least one of the plurality of antennas for beamforming is based on the determined direction.

8. The apparatus of claim 7, wherein the configuration of the at least one of the plurality of antennas for beamforming includes:

adjust at least one beamforming weight of the at least one of the plurality of antennas based on the determined direction.

9. A method of wireless communication of an apparatus, comprising:
  detecting signals via a plurality of detectors, wherein:
    each of the plurality of detectors has a respective Golay correlator and detects a signal received by a corresponding one of a plurality of antennas when each of the plurality of antennas is configured for an omni-mode of signal reception,
    each of the plurality of detectors is located on a respective one of a plurality of radio frequency (RF) chips,
    each of the plurality of detectors comprises a 1-bit or 2-bit analog-to-digital converter (ADC) for processing the signal received from the corresponding one of the plurality of antennas, and
    each of the plurality of detectors comprises a ADC clock for clocking the ADC, the ADC clock having a frequency that is a carrier frequency divided by an integer;
  detecting, by at least one processor separate from the plurality of RF chips, a remote apparatus based on one or more outputs from the plurality of detectors; and
  configuring, by the at least one processor, at least one of the plurality of antennas for beamforming based on the detecting the remote apparatus during the omni-mode of signal reception.

10. The method of claim 9, further comprising controlling behavior of one or more of the plurality of detectors by using a set of commands.

11. The method of claim 9, wherein the detecting the remote apparatus comprises combining the outputs from the plurality of detectors.

12. The method of claim 9, wherein the detecting the remote apparatus comprises allowing at most one of the plurality of detectors to output a detection declaration at a time.

13. The method of claim 9, wherein the detecting the remote apparatus comprises disconnecting from each of the plurality of detectors that does not detect the signal from a corresponding one of the plurality of antennas.

14. The method of claim 9, wherein the detecting the signals comprises estimating at least one of frequency, gain, signal-to-noise ratio (SNR), in-phase (I) and quadrature (Q) signal mismatch, or phase, and further wherein the detecting the remote apparatus comprises calibrating the apparatus based on the estimation.

15. The method of claim 9, further comprising:
  determining, by the at least one processor, a direction of the remote apparatus based on the detection of the remote apparatus, and
  wherein the configuring of the at least one of the plurality of antennas for beamforming is based on the determined direction.

16. The method of claim 9, wherein the configuring of the at least one of the plurality of antennas for beamforming includes:
  adjusting at least one beamforming weight of the at least one of the plurality of antennas based on the determined direction.

17. An access point (AP) for wireless communication, comprising:
  a plurality of antennas;
  a plurality of detectors each having a respective Golay correlator, and each of the plurality of detectors being configured to detect a signal received by a corresponding one of the plurality of antennas when each of the plurality of antennas is configured for an omni-mode of signal reception,
    wherein each of the plurality of detectors is located on a respective one of a plurality of radio frequency (RF) chips,
    wherein each of the plurality of detectors comprises a 1-bit or 2-bit analog-to-digital converter (ADC) for processing the signal received from the corresponding one of the plurality of antennas, and
    wherein each of the plurality of detectors comprises a ADC clock for clocking the ADC, the ADC clock having a frequency that is a carrier frequency divided by an integer; and
  a processing system, separate from the plurality of RF chips, configured to:
    detect a remote apparatus based on one or more outputs from the plurality of detectors, and
    configure at least one of the plurality of antennas for beamforming based on the detection of the remote apparatus during the omni-mode of signal reception.

18. The AP of claim 17, wherein the processing system is further configured to:
  determine a direction of the remote apparatus based on the detection of the remote apparatus, and
  wherein the configuration of the at least one of the plurality of antennas for beamforming is based on the determined direction.

19. The AP of claim 17, wherein the configuration of the at least one of the plurality of antennas for beamforming includes:
  adjust at least one beamforming weight of the at least one of the plurality of antennas based on the determined direction.

20. The AP of claim 17, wherein the processing system controls behavior of one or more of the plurality of detectors by using a set of commands.

21. The AP of claim 17, wherein the processing system comprises a logic OR gate coupled to outputs of the plurality of detectors.

22. The AP of claim 17, wherein the processing system is further configured to allow at most one of the plurality of detectors to output a detection declaration to the processing system at a time.

23. The AP of claim 17, wherein the processing system is further configured to disconnect from each of the plurality of detectors that does not detect the signal from a corresponding one of the plurality of antennas.

24. The AP of claim 17, wherein each of the plurality of detectors is further configured to estimate at least one of frequency, gain, signal-to-noise ratio (SNR), in-phase (I) and quadrature (Q) signal mismatch, or phase and further wherein the processing system is configured to calibrate the apparatus based on the estimation.

25. An apparatus for wireless communication, comprising:
  a plurality of detectors, each of the plurality of detectors being configured to detect a signal received by a corresponding one of a plurality of antennas when each of the plurality of antennas is configured for an omni-mode of signal reception, wherein:
    each of the plurality of detectors is located on a respective one of a plurality of radio frequency (RF) chips,
    each of the plurality of detectors comprises a 1-bit or 2-bit analog-to-digital converter (ADC) for processing the signal received from the corresponding one of the plurality of antennas, and each of the plurality of detectors comprises a ADC clock for clocking the ADC, the ADC clock having a frequency that is a carrier frequency divided by an integer; and a processing system, separate from the plurality of RF chips, configured to:

detect a remote apparatus based on outputs from the plurality of detectors, and configure at least one of the plurality of antennas for beamforming based on the detection of the remote apparatus during the omni-mode of signal reception.

26. The apparatus of claim 25, wherein the processing system controls behavior of one or more of the plurality of detectors by using a set of commands.

27. The apparatus of claim 25, wherein the processing system comprises a logic OR gate coupled to outputs of the plurality of detectors.

28. The apparatus of claim 25, wherein the processing system is further configured to allow at most one of the plurality of detectors to output a detection declaration to the processing system at a time.

29. The apparatus of claim 25, wherein the processing system is further configured to disconnect from each of the plurality of detectors that does not detect the signal from a corresponding one of the plurality of antennas.

30. A method of wireless communication of an apparatus, comprising:

detecting signals via a plurality of detectors, wherein:

each of the plurality of detectors detects a signal received by a corresponding one of a plurality of antennas when each of the plurality of antennas is configured for an omni-mode of signal reception, each of the plurality of detectors is located on a respective one of a plurality of radio frequency (RF) chips, each of the plurality of detectors comprises a 1-bit or 2-bit analog-to-digital converter (ADC) for processing the signal received from the corresponding one of the plurality of antennas, and each of the plurality of detectors comprises a ADC clock for clocking the ADC, the ADC clock having a frequency that is a carrier frequency divided by an integer; and detecting, by at least one processor separate from the plurality of RF chips, a remote apparatus based on outputs from the plurality of detectors; and configuring, by the at least one processor, at least one of the plurality of antennas for beamforming based on the detecting the remote apparatus during the omni-mode of signal reception.

31. The method of claim 30, further comprising controlling behavior of one or more of the plurality of detectors by using a set of commands.

32. The method of claim 30, wherein the detecting the remote apparatus comprises combining the outputs from the plurality of detectors.

33. The method of claim 30, wherein the detecting the remote apparatus comprises allowing at most one of the plurality of detectors to output a detection declaration at a time.

34. The method of claim 30, wherein the detecting the remote apparatus comprises disconnecting from each of the plurality of detectors that does not detect the signal from a corresponding one of the plurality of antennas.

35. An access point (AP) for wireless communication, comprising:

a plurality of antennas;

a plurality of detectors, each of the plurality of detectors being configured to detect a signal received by a corresponding one of the plurality of antennas when each of the plurality of antennas is configured for an omni-mode of signal reception, wherein each of the plurality of detectors is located on a respective one of a plurality of radio frequency (RF) chips, wherein each of the plurality of detectors comprises a 1-bit or 2-bit analog-to-digital converter (ADC) for processing the signal received from the corresponding one of the plurality of antennas, and wherein each of the plurality of detectors comprises a ADC clock for clocking the ADC, the ADC clock having a frequency that is a carrier frequency divided by an integer; and a processing system, separate from the plurality of RF chips, configured to: detect a remote apparatus based on outputs from the plurality of detectors, and configure at least one of the plurality of antennas for beamforming based on the detection of the remote apparatus during the omni-mode of signal reception.

36. The AP of claim 35, wherein each of the plurality of detectors includes a respective Golay correlator.

* * * * *